June 10, 1969  P. C. SYMMONS  3,448,755

NON-SCALD MIXING VALVE

Filed May 9, 1966 Sheet 1 of 2

INVENTOR.
PAUL C. SYMMONS
BY
Nicholas A. Pandiscio
ATTORNEY

INVENTOR.
PAUL C. SYMMONS

3,448,755
NON-SCALD MIXING VALVE
Paul C. Symmons, Newton, Mass., assignor to Symmons Engineering Company, Boston, Mass., a corporation of Massachusetts
Filed May 9, 1966, Ser. No. 548,529
Int. Cl. F16k *11/07*
U.S. Cl. 137—100                                6 Claims

ABSTRACT OF THE DISCLOSURE

A plumbing fixture comprising a manually operable non-scald hot and cold water mixing valve and a diverter valve combined in a common valve body, the diverter valve providing volume control and having an operating stem that is telescopically connected to the diverter valve member.

---

This invention relates to non-scald mixing valves and more particularly to an improvement in mixing valves of the type described and claimed in my U.S. Patents Nos. 2,308,127 and 3,099,996.

Non-scald mixing valves using a water pressure equalization piston valve as provided in the afore-mentioned patents have gained wide acceptance because they have substantially eliminated the danger of accidental scalding resulting from a sharp change in mixed water temperature as a consequence of an increase in hot water pressure or a decrease in cold water pressure. An important feature of these non-scalding valves is a volume control for varying the rate of flow of mixed water independently of mixed water temperature. An essential requirement of the volume control feature is that it not necessitate any fundamental change in the construction of the piston valve. This not only assures proper operation of the piston valve but also provides the option of omitting the volume control feature where it is not desired. In the designs disclosed in the aforementioned patents, volume control was achieved by providing means for rotating the pressure equalization piston within the main valve member, with inlet ports in the main valve member being closeable in varying degrees by the piston as the latter is rotated. The volume control arrangements disclosed in the aforementioned patents comply with the essential requirement of not involving fundamental modifications of the piston valve. However, effecting mixed water volume control by controlling the flow of hot and cold water on the inlet side imposes a critical restriction on the operation of the piston valve. As indicated by my U.S. Patent No. 3,099,996, the pressure equalizer piston valve will not respond as well to pressure changes at low rates of flow. Therefore, to assure satisfactory operation of the piston valve almost immediately with opening of the main valve, it is necessary to design the volume control so that regardless of the degree of rotation of the piston valve by the volume control knob, the piston valve will always experience some through-flow of water when the main valve member is open. Unfortunately this restriction is not satisfactory under all conditions. If the volume control is designed so that as to give a satisfactory level of minimum flow through this piston valve at moderate water pressures, then at lower pressures the piston valve will not function properly and the mixed water temperature will shift. On the other hand, if the volume control is designed with a minimum output limit that assures satisfactory performance of the piston valve at low pressures, the minimum through-flow at higher water pressures will be undesirably large and the volume control will provide only a limited range of control. Since water pressures vary widely from one geographic area to another, and even from one community to another, and because it is economically impractical to manufacture valve members with different size inlet ports for different ranges of inlet water pressure, it has been necessary heretofore to strike a balance and establish an optimum design calculated to avoid excessive interference with operation of the piston valve at very low water pressures while keeping the mixed water flow at the minimum volume setting within tolerable limits. However, such a valve design is not completely satisfactory and in practice the piston valve operates at no better than 90% of proper performance at low inlet pressures.

Accordingly one object of the present invention is to provide a non-scald mixing valve of the type described with a volume control that permits the water pressure equalizing piston valve to maintain the mixed water at a selected temperature through all changes in mixed water flow rate resulting from operation of the volume control.

Another object is to provide a non-scald mixing valve of the character described with an improved volume control adapted to vary the rate of discharge of mixed water without impairing operation of the pressure balancing piston even under a sharp reduction in inlet water pressure.

In a large number of installations one non-scald mixing valve is employed to provide mixed water to both a bath tub spout and a shower head, with a separate diverter valve being provided to divert the mixed water from one to the other of the two discharge fixtures. Use of a separate diverter valve involves additional plumbing costs over and above the cost of the diverter valve per se, and in some cases has the further disadvantages of not locking in the shower discharge position until a substantial flow of water occurs and of involving the additional cost of an attractively designed escutcheon for the operating portion of the diverter valve that projects from the wall of the bath enclosure.

It is a further object of this invention to overcome the foregoing problem by providing a non-scald mixing valve with a novel built-in diverter valve, the latter having the additional function of providing control of the volume of mixed water delivered by the mixing valve to the tub and shower discharge fixtures.

Other objects and many of the attendant advantages of the present invention will become more readily apparent from the following detailed specification when considered together with the accompanying drawings, wherein.

Figure 1:
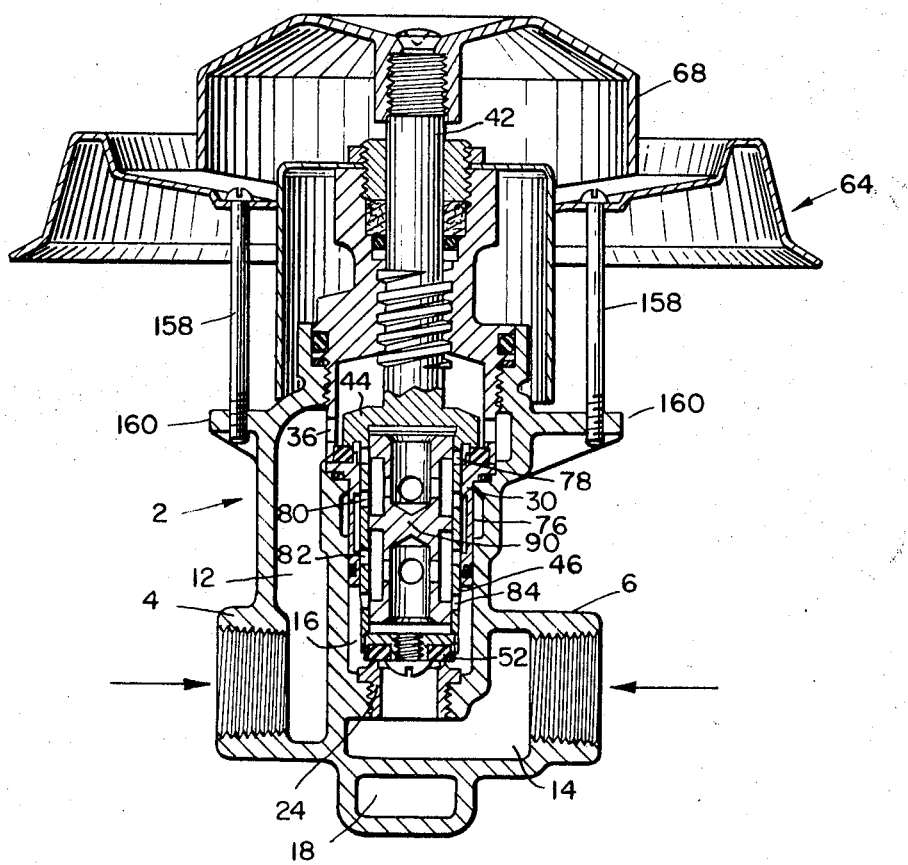
FIG. 1 is an axial section of a non-scald mixing valve embodying the present invention.
Figure 2:
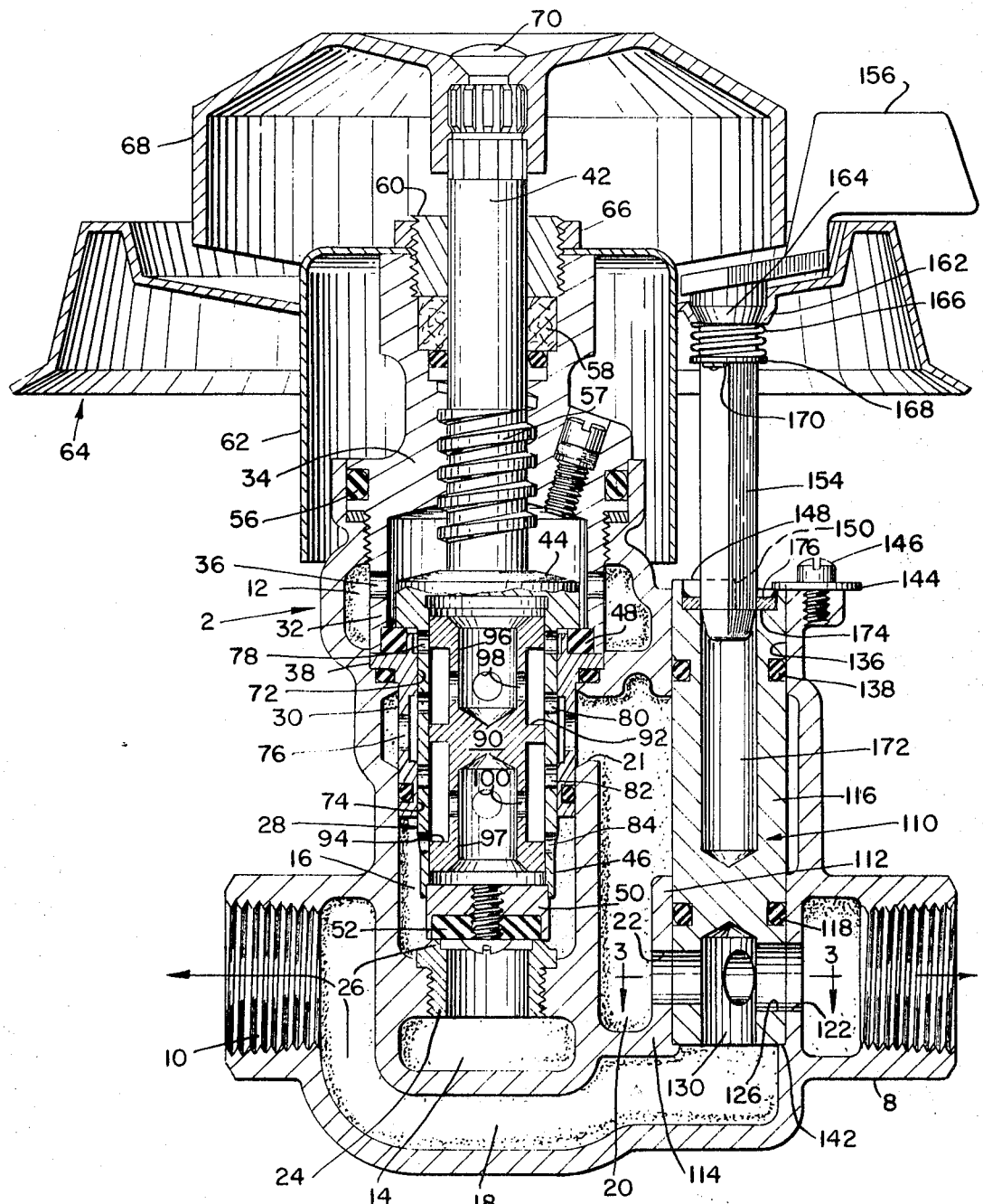
FIG. 2 is an axial section of the same valve but on an enlarged scale taken at right angles to the section of FIG. 1.

The preferred embodiment of the invention illustrated in FIGS. 1 and 2 comprises a valve body 2 in the form of a cored casting having oppositely disposed hollow bosses 4 and 6 that function as inlet ports for cold and hot water respectively. These bosses are internally threaded for connection to cold and hot water supply pipes. The valve body also has two additional bosses 8 and 10 that function as outlet ports for delivering the mixed fluids to a tub spout and a shower head respectively. Bosses 8 and 10 are internally threaded for connection to pipes leading to a tub spout and a shower head. The interior of valve body 2 is subdivided by internal partitions into two inlet passageways 12 and 14 connected with inlet ports 4 and 6 respectively, a main valve chamber 16, an outlet passageway 18 that communicates with outlet port 10, and an outlet chamber 20 communicating with valve chamber 16 via an opening 21 and communicating with outlet port 8 and outlet passageway 18 by an opening 22. Inlet passageway 14 is connected to valve chamber 16 via an annular bushing 24 that is fitted into a hole in the partition separating the valve chamber and inlet passageway 14. Bushing 24 is provided with a raised shoulder 26 that functions as a seat for the bottom end of a main valve assembly identified generally by numeral 28. At the end opposite bushing 24 the valve chamber 16 is formed with an opening that connects with inlet passageway 12 and is occupied by a sleeve 30 that forms the lower section of a valve casing for the main valve assembly 28. The upper section of the main valve casing takes the form of a sleeve extension 32 formed on the inner end of a bonnet 34 that is screwed into a suitable aperture formed in valve body 2 and supports main valve assembly 28. Sleeve extension 32 is provided with a plurality of holes 36 that provide communication between inleta passageway 12 and the interior of the sleeve extension. The bottom end of sleeve extension 32 bears against a flange 38 formed on the adjacent end of sleeve 30 and forces it against a shoulder formed within valve body 2 so that the sleeve 30 cannot move relative to the main valve chamber 16.

The main valve assembly 28 is formed integral with a valve stem 42 and comprises an enlarged valve head 44 and a tubular cylindrical valve section 46. Valve head 44 is adapted to engage a resilient valve seat 48 that is captivated between sleeve extension 32 and flange 38. As explained later, valve head 44 controls flow of cold water through the valve casing. The bottom end of the valve casing is permanently closed by a plug valve 50 having a resilient washer 52 that is adapted to engage the seat provided by shoulder 26 of bushing 24. As explained hereinafter, plug valve 50 controls admission of hot water to the valve chamber 16.

The bonnet 34 is screwed tightly into valve body 2, with an O-ring 56 interposed between the two members so as to prevent leakage. Bonnet 34 has an axial bore that is provided with internal threads that are engaged by complementary threads 57 on the valve stem 42. It also is provided with a tapped counterbore to receive a suitable packing 58 that is compressed by a bushing 60 screwed into bonnet 34 and acts as a gland to prevent leakage of fluid from within the sleeve extension 32. The outer end of bonnet 34 and bushing 60 also coact to provide a mount for a cup-shaped member 62 that functions as the dome or central section of a separate ornamental escutcheon 64 that seats against the wall in which valve body 2 is mounted. The cup-shaped member has a central opening so that it will fit over bushing 60 and seat on the end of bonnet 34. A nut 66 screws onto the end of bushing 60 and locks the cup-shaped member in place. A handle 68 is mounted on the outer end of valve stem 42, being held in place by a suitable screw 70. By virtue of the construction above described, rotative movement of handle 68 will cause the valve stem 42 to screw in and out relative to the bonnet 34, thereby causing corresponding longitudinal movement of main valve assembly 28 relative to its valve casing. As the valve stem is withdrawn by rotation of handle 68, valve head 44 will rise off of its seat 48 and simultaneously plug valve 50 will rise off of the seat provided by shoulder 26, thereby admitting both hot and cold water to the casing for the main valve assembly.

At this point it is to be noted that the sleeve 30 comprising the lower section of the main valve casing is formed with two bearing surfaces 72 and 74 which act as guides for the cylindrical valve section 46. Sleeve 30 is also provided with a plurality of side openings 76 that provide communication between its interior and outlet chamber 20 via the opening 21. It is to be observed also that the cylindrical valve section 46 is provided with four sets of holes 78, 80, 82 and 84 arranged in descending order in FIGS. 1 and 2. In the illustrated device, each set of holes consists of two diametrically opposed holes, but a larger number of holes may be provided in each set. The essential thing is that the holes in each set are located in a common plane extending transversely of the tubular valve section 46. The arrangement of holes 78, 80, 82 and 84 is such that with the valve heads 44 and 50 closed on their respective valve seats as shown in FIGS. 1 and 2, holes 78 are above the bearing 72, holes 80 are below bearing 72 in communication with the interior of the sleeve 30 and its outlet holes 76, holes 82 are blocked by bearing 74, and holes 84 are below bearing 74 in communication with valve chamber 16.

If handle 68 is turned open ¼ of a revolution, valves 44 and 50 will be open. However only cold water will be able to flow through the mixing valve. The cold water will flow in turn into the main valve casing via inlet passageway 12 and holes 36, into the main valve via holes 78, out of the main valve into its casing via holes 80, out of the valve casing into the outlet chamber 20 via holes 76 and 21, out of the outlet chamber into discharge outlet 8 and 10 via hole 22. Hot water flow will be prevented because holes 82 will still be blocked by bearing 74. If the handle is turned an additional ¼ revolution, both hot and cold water will flow through the valve. At this point half of the holes 80 will be blocked by bearing 72, half of holes 82 will be blocked by bearing 74, and holes 84 will be unblocked. If the handle 68 is turned fully open (almost another ½ revolution) the holes 80 will be fully blocked by bearing 72 and the holes 82 will be fully open to the valve chamber 16. Accordingly, only hot water will flow through the valve. Various intermediate settings of handle 68 will provide for different size outlet areas, i.e., different exposures of holes 80 and 82. It is believed to be apparent from the foregoing description that to the extent described the illustrated device permits selection of mixed water temperature in the complete range between cold inlet water temperature and hot inlet water temperature and the selected mixed water temperature will remain fixed so long as the hot and cold water pressures remain steady.

To hold the mixed water temperature steady despite fluctuations in inlet water pressures there is provided a pressure equalizing piston valve 90 slidably disposed within and forming part of the main valve assembly. Piston valve 90 is a cylindrical member sized to make a close sliding fit with the tubular section 46 of the main valve assembly. The piston valve is provided with two circumferentially extending peripheral grooves 92 and 94 that coact with the tubular section 46 to define two annular chambers. Additionally the piston valve is formed with two axial bores 96 and 97 at its opposite ends. These bores are open to the annular chambers formed by grooves 92 and 94 by way of suitable holes 98 and 100. Preferably there are four holes 98 and 100 arranged in quadrature relation with each other. The inlet ports 78 and 84 for cold and hot water respectively are closeable in varying amounts by the equalizing piston valve 90 according to fluctuations in water pressure. As cold water is supplied via port 78, it will pass through the annular chamber formed by groove 92 and hole 98 into the chamber formed by bore 96, and simultaneously hot water supplied through the inlet port 84 into the annular chamber formed by groove 94 will flow through the hole 100 into the chamber formed by bore 97. Accordingly the opposite ends of the piston valve 90 will be influenced by the hot and cold water pressure. These opposing fluid pressures will cause the piston valve to move in one direction or the other depending upon the change in pressure of one or both of the fluids. When the cold water pressure drops, the equalizing piston valve will move toward the valve head 44 so as to close off more of the hot water inlets 84 and unblock more of cold water inlets 78. The reverse action occurs if there is a relative drop in hot water pressure. By virtue of such action the delivery of scalding fluid is prevented and the opposing fluid pressures of the cold and hot water will automatically position the equalizing piston valve to maintain constant the temperature of mixed water delivered to the discharge chamber 20.

Of course, the specific construction of the main valve, including the equalizing piston valve, may be varied without altering the basic mode of achieving regulation of mixed water temperature. More specifically, the piston valve may be modified in accordance with the teachings of my prior U.S. Patents 2,308,127 and 3,099,996. Thus, for example, the piston valve may have the construction shown in FIG. 4 of my Patent 2,308,127.

Figure 4:
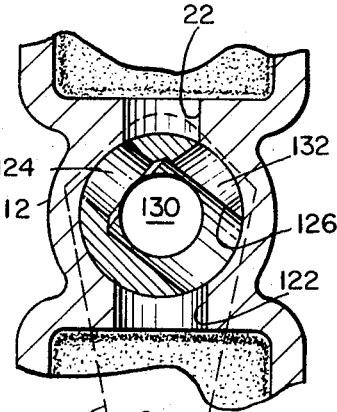
FIGS. 4 and 5 are sectional views taken along the same section line as FIG. 3 but showing two different positions of the volume control-diverter valve.

In this new mixing valve, the path and rate of flow of mixed water from the discharge chamber 20 is controlled by a diverter valve identified generally at 110 (see FIG. 2) disposed between the discharge chamber and the two ports 8 and 10. The diverter valve comprises an internal valve casing 112 that is formed integral with and in part consists of the outer wall of valve body 2 and an internal partition 114 separating the outlet passageway 18 from the outlet chamber 20. This internal valve casing is located in line with outlet port 8 and is in the form of a hollow sleeve with its bottom end communicating with the outlet passageway 18. The internal diameter of the valve casing 112 is sized so as to accommodate a cylindrical diverter valve member 116. The latter is provided with a peripheral groove in which is disposed an O-ring 118 that functions as a seal so as to prevent water from flowing between the valve member and the surrounding valve casing. Hole 22 mentioned earlier is formed in the side of partition 114. A second hole 122 is formed in valve casing 112 on the side of the outer wall of valve body 2. Both of these holes are in axial alignment with outlet port 8. Hole 122 has a larger diameter than hole 22. The diverter valve member 116 is provided with two aligned radial bores 124 and 126 that intersect an axial bore 130 that communicates with outlet passageway 18. The two bores 124 and 126 are at the same level and the valve member is positioned so that these bores are located in coplanar relation with holes 22 and 122. Bore 124 has the same diameter as hole 22 and bore 126 has approximately the same diameter as hole 122. The diverter valve member is also provided with another radial bore 132 that is in the same plane as bores 124 and 126 but is displaced therefrom by an angle of approximately 60° (as seen in FIGS. 2 and 4). Bore 132 has the same diameter as hole 22 and bore 124.

The upper end of valve member 116 is rotatably supported by the valve body 2, the latter being provided with a circular aperture 136 that is sized to snugly receive the valve member. The valve member 116 is provided with a second peripheral groove accommodating a second O-ring 138 that coacts with the valve body 2 in the region of aperture 136 to prevent leakage of water.

The bottom end of valve member 116 seats against a shoulder 142 formed at the bottom end of valve casing 112. The diverter valve member is captivated so as to remain in contact with shoulder 142. This is accomplished by an annular ring 144 that is held in place by means of a screw 146 anchored in valve body 2 and extends over the end of the diverter valve member. Ring 144 has a second function: it limits rotation of the valve member 116. In this connection it is to be noted that the end of valve member 116 engaged by ring 144 is provided with a peripheral shoulder 148. This shoulder extends around the edge of the diverter valve member through an angle of approximately 210°. The ends of shoulder 148, one of which is shown at 150, coact with ring 144 to limit rotation of the valve member. One end of shoulder 148 engages ring 144 when the diverter valve member is rotated in one direction, while the other end of the same lip engages ring 144 when the valve member is rotated in the opposite direction.

Movement of valve member 116 is accomplished by means of a valve stem 154 carrying a handle 156. The valve stem and its handle are carried by escutcheon member 64 that serves to conceal the mixing valve when the latter is installed in a wall. The escutcheon is a dish-shaped member and is provided with a central opening to accommodate cup-shaped member 62. The escutcheon is seperable from the valve body and is drawn up tight against the wall in which the mixing valve is located by means of two screws 158 that screw into tapped ears 160 formed integral with valve body 2.

To rotatably support valve stem 154 the escutcheon is provided with a hole defined by a tapered circular flange 162 that acts as a collar. Valve stem 154 is provided with a circular enlargement 164 that coacts with flange 162 to limit its inward movement. Outward movement of stem 154 is prevented by a coil spring 166 and a ring 168 held in place on the stem by cotter pin 170. Below enlargement 164 the stem 162 is of square cross section. When the escutcheon is in place as shown in FIGS. 1 and 2, stem 154 extends down into the valve member 116, the latter being provided with an axial bore 172 for this purpose. The upper end of valve member 116 is also provided with a counterbore 174 in which is secured a ring 176 having a square aperture sized to make a sliding fit with stem 154. The aperture in ring 176 prevents stem 154 from rotating relative to valve member 116, so that when handle 156 is moved the stem will cause rotation of the valve member. This telescoping connection between stem 154 and valve member 116 compensates for variations from one installation to another. The stem will remain in operative engagement with valve member 116 regardless of whether the escutcheon is positioned as shown in FIGS. 1 and 2 or has a final position closer to the valve body. This telescoping connection also facilitates removal of stem 154.

Figure 3:
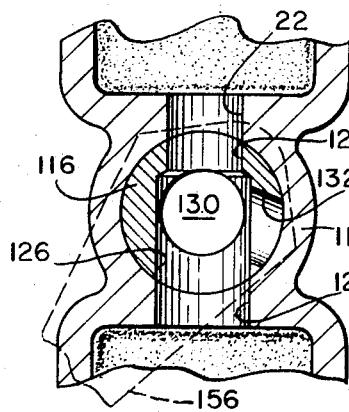
FIG. 3 is a sectional view of the volume control-diverter valve taken substantially along line 3—3 of FIG. 2.
Figure 5:
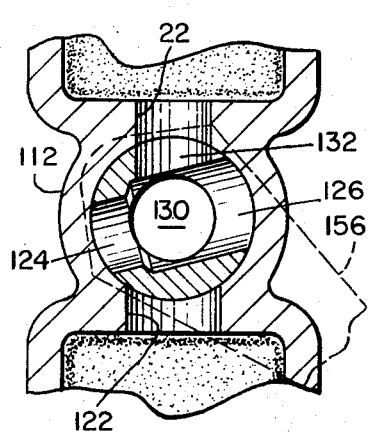

Operation of the valume control-diverter valve member will now be described with reference to FIGS. 3, 4 and 5. FIG. 3 illustrates the operating handle 156 in its leftmost position; FIG. 4 shows the same handle in its center or intermediate position; and FIG. 5 shows the same handle 160 in its right-most position. When the handle is positioned as shown in FIG. 3, the diverter valve member is set to pass water to tub spout port 8. Although the valve member's axial bore 130 is open to outlet passageway 18, no fluid will flow to the shower head outlet port 110 via outlet passageway 18 because of the venturi action caused by flow through the valve member into the outlet port 8. It is to be noted that with the handle 156 positioned as shown in FIG. 3, the radial port 132 is blocked by the wall of the internal valve casing 112. When the handle is shifted to the position shown in FIG. 4, the two radial ports 124 and 132 will both be blocked off by the valve casing wall so that no water can flow through the valve. In practice, a slight drip through the tub outlet will occur due to the fact that water will leak between valve member 116 and the surrounding valve casing. When the diverter valve is moved to the position shown in FIG. 5, the radial bore 132 will be aligned with hole 22, while both of the other radial bores 124 and 126 will be blocked off by the valve casing. Accordingly the water will flow from the discharge chamber 20 through hole 22, the radial port 132, and the axial port 130 into the outlet passageway 18 communicating with the shower head outlet port 10. In this same position, no water will flow to the tub spout.

It is believed to be apparent from inspection of FIGS. 3, 4 and 5 that the diverter valve also provide control of the rate of flow of fluid from the outlet chamber 20 to the outlet ports 8 and 10. When the diverter valve member is in the position of FIG. 3, it is set to deliver maximum flow to the outlet port 8. As the handle is rotated counterclockwise to the position shown in FIG. 4, less of the radial bore 124 is exposed to hole 22; that is, more of radial bore 124 becomes blocked by valve casing 112. Therefore, the flow of mixed water diminishes to minimum flow. On the other hand, as the diverter valve member is rotated further toward the position shown in FIG.

5, the radial port 132 commences to come into alignment with hole 22. When this occurs water will commence to flow to the outlet port 10, with the rate of flow increasing as the diverter valve member approaches the position illustrated in FIG. 5. When the valve member 116 reaches the position of FIG. 5, the flow of mixed fluid to the outlet port 10 is maximum.

It is believed to be apparent from the foregoing description and the accompanying drawings that the present invention provides a combination of a non-scald mixing valve with a diverter valve that is built into the same valve body and provides volume control at the outlet end of the valve. In the illustrated embodiment the diverter valve operates to divert flow from one to the other of two different outlet ports 8 and 10. However, it is to be appreciated that the valve body may be made with only one outlet port (or one outlet port may be permanently blocked off by a plug), in which case the diverter valve could be designed so as to function primarily as a volume control for the single outlet port. By way of example, this may be accomplished by eliminating axial bore 130 and the radial bore 132, leaving only the radial ports 124 and 126 to provide maximum output to the single outlet port 8 when fully aligned with hole 22 and provide a varying output to the same outlet port as the valve member is rotated. The advantage of the illustrated diverter valve construction is that volume control is effected without requiring modification of the main control valve and without modifying or restricting the inlet water pressures seen by the piston valve. The piston valve will see the full inlet cold and hot water pressures even when it is in the position shown in FIG. 4 when no fluid can be discharged to the outlet ports 8 and 10. Although a reduction in water pressure occurs in the outlet chamber 20 when the diverter valve is in the position of FIG. 3 or the position of FIG. 5, this reduction in outlet pressure has a negligible effect on the piston valve.

Another advantage of the invention above described and illustrated in the accompanying drawings is that the operating handle for the diverter valve is located proximate to the operating handle for the main valve. Still other advantages are that the diverter valve member is removable from the valve body 2 without disturbing the main valve and the diverter valve stem can telescope with the escutcheon 64. Still other advantages are believed to be apparent to persons skilled in the art.

I claim:
1. A mixing valve including a manually operable non-scald mixing valve assembly adapted to mix hot and cold water, an outlet chamber for receiving mixed water from said mixing valve assembly, two outlet ports communicating with said outlet chamber, and a rotatable diverter valve member for diverting flow of fluid from said outlet chamber to either of said ports and for varying the volume of fluid delivered to at least one of said ports, said rotatable diverter valve member being hollow and having (a) first and second inlet holes disposed so that said first inlet hole communicates with said outlet chamber when said diverter valve member is in one position and said second inlet hole communicates with said outlet chamber when said diverter valve member is in a second position, (b) a first outlet hole that is always open to one of said two ports, and (c) a second outlet hole that is closed to the other of said two ports when said diverter valve member is in said second position.

2. A mixing valve as defined by claim 1 wherein said first and second inlet holes and said second outlet hole are formed in the side of said rotatable diverter valve member and said first outlet hole is formed in one end of said rotatable diverter valve member.

3. A mixing valve for two fluids under pressure and having different temperatures comprising a valve body provided with a separate inlet port for each fluid and first and second outlet ports, means in said body providing two interior inlet passages each communicating with a different inlet port and an interior outlet chamber, a main valve member projecting into said body, a handle on the outer end of said main valve member, means mounting said main valve member for axial movement in response to movement of said handle, said main valve member including a tubular section having inlet and outlet holes for each fluid, said main valve member being operable to establish communication between said two inlet passageways and said outlet chamber via inlet and outlet holes, a free pressure-equalizing piston valve within said tubular section, said piston valve comprising means for varying the effective size of said inlet holes inversely but proportionally for said two fluids as said piston valve moves longitudinally in asid tubular section, means for subjecting the opposite ends of said piston valve to the opposing pressures of said fluids whereby changes in fluid pressure will cause it to move longitudinally in a direction and by an amount substantially sufficient to regulate the flow of fluids so as to maintain substantially constant the temperature of a mixture of said fluids flowing through said interior outlet chamber, means within and integral with said body providing a diverter valve casing located between said outlet chamber and said first and second outlet ports, said casing having a cylindrical bore extending parallel to the axis of rotation of said main valve member, said bore having a first open end communicating with said first outlet port and a second open end for receiving a diverter valve member, said casing also having a side inlet hole communicating with said interior oultet chamber and a side outlet hole communicating with said second outlet port, an aperture in said valve body aligned with said cylindrical bore, and a manually operable diverter valve member rotatably supported in said casing, said diverter valve member being removable through said aperture and fully occupying said first and second open ends of said cylindrical bore, said diverter valve member having an axially extending bore at its inner end open to said first outlet port and side openings intersecting said axially extending bore, said side openings being disposed for selective registration with said side inlet and outlet holes so that said diverter valve member is effective on rotation thereof to (a) selectively divert said fluid mixture to one or the other of said first and second outlet ports and (b) vary the volume of said fluid mixture discharged from said outlet chamber.

4. A mixing valve as defined by claim 3 wherein said diverter valve member is rotatably mounted in said aperture.

5. A mixing valve as defined by claim 3 further including releasable means attached to said body preventing axial movement of said diverter valve member.

6. A mixing valve as defined by claim 3 further including an escutcheon adapted to conceal said body when said mixing valve is mounted in a wall, means for attaching said escutcheon to said body, an operating stem for said diverter valve member rotatably attached to said escutcheon, means preventing axial movement of said diverter valve stem relative to said escutcheon, and means providing a telescoping connection between said stem and diverter valve member so that said diverter valve member will rotate with said stem and said stem will be separated from said diverter valve member when said escutcheon is detached and pulled away from said mixing valve body.

References Cited
UNITED STATES PATENTS

| | | | |
|---|---|---|---|
| 1,736,843 | 11/1929 | Benson | 137—360 |
| 2,031,932 | 2/1936 | Cornell | 137—597 |
| 2,308,127 | 1/1943 | Symmons | 137—100 |
| 3,192,939 | 7/1965 | Moen | 137—98 |

ALAN COHAN, *Primary Examiner.*

H. M. COHN, *Assistant Examiner.*

U.S. Cl. X.R.

137—597, 359